(12) United States Patent
Suau et al.

(10) Patent No.: US 9,273,176 B2
(45) Date of Patent: Mar. 1, 2016

(54) ASSOCIATIVE NON-IONIC THICKENING AGENTS CONTAINING ALKYL CYCLOHEXANOL ALKOXYLATES, THEIR USES AND FORMULATIONS CONTAINING THEM

(71) Applicant: COATEX S.A.S., Genay (FR)

(72) Inventors: Jean-Marc Suau, Lucenay (FR); Denis Ruhlmann, Genay (FR)

(73) Assignee: COATEX, Genay (FR)

( * ) Notice: Subject to any disclaimer, the term of this patent is extended or adjusted under 35 U.S.C. 154(b) by 3 days.

(21) Appl. No.: 13/671,736

(22) Filed: Nov. 8, 2012

(65) Prior Publication Data

US 2013/0131189 A1 May 23, 2013

Related U.S. Application Data

(60) Provisional application No. 61/562,484, filed on Nov. 22, 2011.

(30) Foreign Application Priority Data

Nov. 18, 2011 (FR) ...................... 11 03521

(51) Int. Cl.
    C08G 18/28 (2006.01)
    C08L 75/08 (2006.01)
    C09D 175/08 (2006.01)
    C08G 18/48 (2006.01)
    C09D 7/00 (2006.01)

(52) U.S. Cl.
    CPC ............ *C08G 18/283* (2013.01); *C08G 18/282* (2013.01); *C08G 18/289* (2013.01); *C08G 18/2825* (2013.01); *C08G 18/2835* (2013.01); *C08G 18/48* (2013.01); *C08G 18/4833* (2013.01); *C08L 75/08* (2013.01); *C09D 7/002* (2013.01); *C09D 175/08* (2013.01)

(58) Field of Classification Search
    CPC ............... C08G 18/282; C08G 18/283; C08G 18/2835; C08G 18/4833; C09D 175/08
    USPC .............................. 524/590, 591, 839; 528/49
    See application file for complete search history.

(56) References Cited

U.S. PATENT DOCUMENTS

| 3,516,954 A * | 6/1970 | Barnstorf et al. ............ 528/74.5 |
| 4,155,892 A * | 5/1979 | Emmons et al. ............. 524/507 |
| 6,111,146 A | 8/2000 | Rayborn |
| 2005/0187342 A1 | 8/2005 | Schieferstein et al. |
| 2011/0130471 A1 | 6/2011 | Münzenberg et al. |
| 2011/0313053 A1 | 12/2011 | Münzenberg et al. |

FOREIGN PATENT DOCUMENTS

| EP | 1 566 393 A2 | 8/2005 |
| EP | 2 327 732 A1 | 6/2011 |
| EP | 2 361 939 A1 | 8/2011 |
| WO | WO 99/11594 A1 | 3/1999 |

OTHER PUBLICATIONS

International Search Report issued May 13, 2013 in PCT/FR2012/052503 (with English translation of Category of Cited Documents).

* cited by examiner

*Primary Examiner* — Michael L Leonard
(74) *Attorney, Agent, or Firm* — Oblon, McClelland, Maier & Neustadt, L.L.P.

(57) ABSTRACT

The present invention concerns new associative thickening agents belonging to the category of HEURs (Hydrophobically modified Ethylene oxide URethane). These products contain an original associative monomer with a base of alkyl cyclohexanol alkoxylates. Their thickening power is equal to or greater than that procured by HEUR associative thickening agents of the prior art containing grafted alkyl phenols. An efficient substitute product is therefore available, which is free of alkyl phenols, matching current market demand.

9 Claims, No Drawings

ASSOCIATIVE NON-IONIC THICKENING AGENTS CONTAINING ALKYL CYCLOHEXANOL ALKOXYLATES, THEIR USES AND FORMULATIONS CONTAINING THEM

REFERENCE TO PRIOR APPLICATIONS

This application claims priority to U.S. provisional application Ser. No. 61/562,484, filed Nov. 22, 2011; and to French patent application 11 03521, filed Nov. 18, 2011, both incorporated herein by reference.

FIELD OF THE INVENTION

The present invention concerns new associative thickening agents belonging to the category of HEURs (Hydrophobically modified Ethylene oxide URethane). These products contain an original associative monomer with a base of alkyl cyclohexanol alkoxylates. Their thickening power is equal to or greater than that procured by HEUR associative thickening agents of the prior art containing grafted alkyl phenols. An efficient substitute product is therefore now available, which is free of alkyl phenols, matching current market demand.

Additional objects, advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

BACKGROUND OF THE INVENTION

Water-based paint formulations containing mineral fillers consist of an aqueous phase, one or more polymers in emulsion in the liquid phase called binders, fillers and/or pigments, a dispersing agent and admixtures as diverse as surfactants, coalescence agents, biocides, anti-foaming agents and, finally, at least one thickening agent.

The latter enables the rheology of the water-soluble formulations into which it is introduced, and notably water-soluble paints, to be controlled, both at the manufacturing stage, and during transport or storage, or at the time of application. The wide variety of practical constraints in each of these stages relates to a multiplicity of different rheological properties.

Nevertheless, it is possible to summarise the requirement of the skilled man in the art in obtaining an effect of the thickening of the water-based formulation, both for reasons of stability over time, and for a possible application of the paint to a vertical surface, lack of spattering during use, etc. For this reason additives have been designated which contribute to this regulation of the rheological properties under the term "thickening agents".

Among these products, thickening agents known as "associative" thickening agents are distinguished, which are hydrosoluble polymers having insoluble hydrophobic groups. Such macromolecules have an associating character: when introduced into water, the hydrophobic groups tend to assemble in the form of micellar aggregates. These aggregates are linked together by the hydrophilic parts of the polymers: a three-dimensional network is then formed which causes the viscosity of the medium to be increased.

The functional mechanism and the characteristics of the associative thickening agents are now well known and described, for example in the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these associative thickening agents the class of associative thickening agents of the HEUR type (Hydrophobically modified Ethylene oxide URethane) is distinguished. They designate copolymers resulting from the synthesis between a compound of the polyalkylene glycol type, a polyisocyanate, and a monomer or condensate designated "associative", of the alkyl, aryl or aryalkyl type consisting of a hydrophobic terminal group.

These structures are well known to develop high viscosities, with a medium to low shearing gradient (J. of Applied Polymer Science, vol. 58, p 209-230, 1995; Polymeric Mat. Sci. and Engineering, vol. 59, p 1033, 1988; Polymeric Mat. Sci. and Engineering, vol. 61, p 533, 1989; Polymeric Paint Colour Journal, vol. 176, no. 4169, p 459, June 1986), which is equal respectively to the Stormer™ (KU) and Brookfield™ (mPa·s) viscosity measurements.

At the same time, document EP 1 566 393 describes a thickening agent of the HEUR type one of the essential characteristics of which is the presence of n-butyl-1-octanol, while its hydrophobic groups are based on fatty alcohols having 8 to 18 carbon atoms.

Document EP 1 013 264 describes a polyurethane thickening agent for cosmetic formulations, having an associative monomer functionalised by a hydrophobic group which may be linear or branched, but is preferentially linear, and having 12 to 24 carbon atoms.

Document WO 94/06840 proposes an associative thickening agent of the HEUR type, characterised by a certain density of hydrophobic groups, where the said groups are linear alkyl chains having 8 to 22 carbon atoms.

Document EP 1 584 331 proposes a hydrophobic terminal group having 6 to 34 carbon atoms for the associative monomer. To increase specifically the Brookfield™ viscosity.

Document EP 0 639 595 proposes linear hydrophobic groups having 4 to 36 carbon atoms.

Document WO 02/102868 also makes reference to linear structures for the associative monomer.

Independently of the particular rheological profiles provided by the variations described above, the HEURs with the most pronounced thickening power still remain molecules having alkyl phenols grafted on to their associative monomer. One of the representative products of this technology is Acrysol™ SCT-275, developed by the company DOW™.

And alkyl phenols are currently widely suspected of being carcinogenic, and dangerous for reproduction; although still tolerated in the paints industry they nonetheless remain in the firing line of the legislative institutions, notably the European ones.

There is therefore a genuine requirement to develop a HEUR-type associative thickening agent, which is free of alkyl phenols, but which has an equivalent or even improved thickening power. The inventors have discovered, in a completely surprising manner, that the use of certain structures in place of the associative monomer led to such a result.

DETAILED DESCRIPTION OF THE PREFERRED EMBODIMENTS

One embodiment of the present invention is based on the use, as an associative monomer, of a compound the structure of which satisfies the following formula (I):

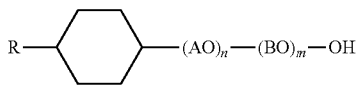

where:
  m and n are integers of less than 150, at least one of which is non-zero,
  A and B designate alkyl groups which are different one from another, and having 2 to 4 carbon atoms, where group AO preferentially designates ethylene oxide, and group BO preferentially designates propylene oxide,
  R designates a linear or branched alkyl group containing 8 to 20 carbon atoms, and preferentially a linear alkyl group having 9 to 12 carbon atoms.

Such compounds have been identified as surfactants, and can be obtained by alkoxylation of an alkyl phenol and hydrogenation of the product obtained. Reference may notably be made to the document U.S. Pat. No. 6,111,146 which describes their synthesis. The resulting compounds are designated by the expression "alkyl cyclohexanol alkoxylates". It is important to add that the final structure is not that of an alkyl phenol, and that the resulting product will not be categorized as such.

The associative thickening agents which result from the polymerization of this monomer of formula (I), of at least one polylakylene glycol and at least one polyisocyanate, have no alkyl phenols; in an unexpected and particularly advantageous manner, they enable a water-based paint to be thickened to a level of viscosity at least equal to that provided by HEURs of the prior art containing alkyl phenols. It is even demonstrated that it is possible to obtain for the invention a rheological profile similar to that proposed by the products of the state of the art for alkyl phenols. A product has therefore successfully been developed which is at least equivalent, and which overcomes the problem relating to the use of alkyl phenols.

Thus, another object of the invention are hydrosoluble polyurethanes containing the following monomers:
  a) of at least one polyalkylene glycol, and
  b) of at least one polyisocyanate, and
  c) of at least one monomer of formula (I)

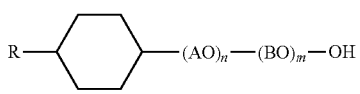

where:
  m and n are integers of less than 150, at least one of which is non-zero,
  A and B designate alkyl groups which are different one from another, and having 2 to 4 carbon atoms, where group AO preferentially designates ethylene oxide, and group BO preferentially designates propylene oxide,
  R designates an alkyl group, whether linear or branched, containing 8 to 20 carbon atoms, and preferentially a linear alkyl group having 9 to 12 carbon atoms.

When a polymer like the hydrosoluble polyurethanes above are referred to as containing a monomer or monomers, one of skill in the art understands that the monomer(s) is (are) present in the polymer in their polymerized form. However, for ease of reference the phrase containing the (respective) monomer or the like is used as shorthand.

"Polyalkylene glycol" is understood to mean a polymer of an alkylene glycol derived from an olefinic oxide. The polyalkylene glycol according to the present invention is, for example, polyethylene glycol, polypropylene glycol, polybutylene glycol or a polyalkylene glycol containing a proportion of an ethylene-oxy group and/or a proportion of a propylene-oxy group and/or a proportion of a butylene-oxy group. The polyalkylene glycol according to the present invention can, for example, include a dominant proportion of an ethylene-oxy group in association with a secondary proportion of a propylene-oxy group. Specific examples of alkylene glycol polymers include: polyalkylene glycols having an average molecular weight of 1,000, 4,000, 6,000, 10,000 and 20,000 g/mol (in the case of polyethylene glycol called PEG-1000, PEG-4000, PEG-6000, PEG 10000 and PEG 20000); polyethylene polypropylene glycols having a percentage of ethylene oxide of between 20 and 80% by weight and a percentage of propylene oxide of between 20 and 80% by weight.

"Polyisocyanate" is understood to mean a compound which includes at least 2 functional isocyanate groups —N=C=O.

The manufacture of these polyurethanes, which belong to the family of HEUR-type thickening agents, is within the skill of the skilled man in the art, who can refer to the teaching of the documents cited above as the technological background of the present invention.

According to one embodiment of the present invention, these polyurethanes result from the condensation of, expressed as a % by weight of each of the monomers, where the sum of these %'s is equal to 100%:
  a) 75% to 99.5% of at least one polyalkylene glycol,
  b) 0.5% to 10% of at least one polyisocyanate and
  c) 15% to 99.5% of at least one monomer of formula (I).

According to one embodiment of the present invention, the polylakylene glycol constituting the polyurethane is polyethylene glycol, According to another embodiment of the present invention, this is a polyethylene glycol of molecular mass of between 2,000 g/mole and 20,000 g/mole, for example between 8,000 g/mole and 15,000 g/mole, or for example between 8,000 g/mole and 12,000 g/mole.

According to one embodiment, the polyisocyanate constituting the polyurethane according to the invention is chosen from among toluene diisocyanate and its dimers and trimers, 1,4-butane diisocyanate, 1,6-hexane diisocyanate, isophorone diisocyanate, 1,3- and 1,4-cyclohexane diisocyanate, 4,4'diisocyanatodicyclohexylmethane, 1-methyl-2,4-diisocyanatocyclohexane and its blend with 1-methyl-2,6-diisocyanatocyclohexane, the biuret of hexamethylene diisocyanate and its dimers and trimers and their blends.

Another object of the present invention are aqueous compositions containing water, at least one polyurethane according to the invention, together with at least one surfactant, and possibly at least one additive chosen from among a biocide, a solvent, an anti-foaming agent, a pH regulator, a coalescence agent, or their blends.

A "biocide" is understood to mean a chemical substance intended to destroy, repel or make harmless harmful organisms, to prevent their action, or to oppose them in any other manner, through a chemical or biological action.

A "surfactant" or "surfactant agent" is understood to mean a non-ionic molecule consisting of at least a hydrophilic part and of at least a hydrophobic part.

An "anti-foaming agent" is understood to mean a substance or a formulation intended to destroy air bubbles within a homogenous or heterogeneous liquid medium (or at its surface), or to prevent their formation.

A "pH regulator" or "pH regulating agent" is understood to mean a chemical compound which enables the pH to be adjusted to the expected value. For example, the pH regulating agent can increase the pH; this is the case with bases, such as NaOH. Alternatively, the pH regulating agent can reduce the pH; this is the case with acids.

A "coalescent agent" is understood to mean an agent used in paints which enables the Minimum Film Formation Temperature (MFFT) of paint to be reduced to a temperature suitable for the desired condition(s) of application (for example a TMFF of 5° C. for outside application). As an example of a coalescent agent according to the invention, propylene glycol, butyl glycol, 2,2,4-trimethyl-1,3-pentanediol monoisobutyrate or 2,2,4-trimethyl-1,3-pentanediol diisobutyrate may be cited.

According to one embodiment, the aqueous compositions of the invention contain, expressed as a % by weight of each of their constituents, where the sum of these % s is preferably equal to 100%:

1) 5% to 45% of at least one polyurethane according to the invention,
2) 5% to 30% of at least one surfactant,
3) 25% to 75% of water,
4) 0 to 5% of at least one additive chosen from among a biocide, a solvent, an anti-foaming agent, a pH regulator, a coalescence agent and their blends.

Another object of the present invention consists in the use of the said polyurethanes and of the said compositions, as thickening agents in aqueous formulations, where the said formulations are for example chosen from among water-based paints, lacquers, varnishes, paper coatings, cosmetic formulations and detergent formulations.

Another object of the present invention lies in the aqueous formulations containing the thickening agents or polyurethanes and the compositions according to the invention, where the said formulations are for example chosen from among water-based paints, lacquers, varnishes, paper coatings, cosmetic formulations and detergent formulations.

A final object of the present invention consists of a method for preparing a polyurethane according to the invention, consisting of a condensation of its different constituents.

The following examples enable the invention to be better understood, without however limiting its scope.

EXAMPLES

Example 1

This example illustrates the manufacture of a water-based paint, in which a thickening agent of the prior art containing an alkyl phenol having 15 carbon atoms and a thickening agent according to the invention, the R group of which is a linear alkyl chain having 9 carbon atoms, are used: the corresponding hydrophobic group therefore contains 15 carbon atoms in this case.

Test No. 1:
This test illustrates the prior art. This corresponds to the use of an aqueous composition with 17.5% by dry weight of a polymer containing grafted alkyl phenols, which is Acrysol™ SCT-275 sold by the company Dow™.

Test No. 2:
This test illustrates the prior art. This corresponds to the use of an aqueous composition containing 17.5% by dry weight of a polymer consisting of, expressed as a % by weight of each of its monomers:
a) 75% of polyethylene glycol of molecular mass by weight equal to 10,000 g/mole,
b) 5% of isophorone diisocyanate,
c) 15% by weight of a monomer of formula HO—(OE)$_n$-R where OE is ethylene oxide, n is equal to 25 and R is the alkyl phenol group having 15 carbon atoms.

Test No. 3:
This test illustrates the invention. This corresponds to the use of an aqueous composition containing 17.5% by dry weight of a polymer consisting of, expressed as a % by weight of each of its monomers:
a) 75% of polyethylene glycol of molecular mass by weight equal to 10,000 g/mole,
b) 5% of isophorone diisocyanate,
c) 15% by weight of a monomer of the following formula

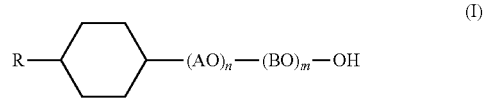

(I)

where m=0 and n=25 and R designates the linear alkyl group having 9 carbon atoms.

In each of the tests no. 1 to 3, 70.6 grams of Mowilith™ LDM 1871, 193.8 grams of bipermuted water and 32 grams of the composition to be tested are introduced into the beaker.

The pH is adjusted by using ammonia (28%) to a value of between 8.6 and 8.9. At 25° C., the Brookfield™ viscosity at 10 and 100 revolutions per minute ($\mu_{Bk10}$ and $\mu_{Bk100}$) and the Stormer™ viscosity ($\mu_s$) of the paint are measured.

The results are shown in table 1.

TABLE 1

| Test n° | 1 | 2 | 3 |
| --- | --- | --- | --- |
| Prior Art INvention | PA | PA | IN |
| $\mu_{Bk10}$ | 13,600 | 12,200 | 13,800 |
| $\mu_{Bk100}$ | 8,700 | 6,800 | 8,850 |
| $\mu_S$ | 135 | 122 | 139 |

Preferred embodiments of the invention, described herein such that one of skill in this art can make and use them, include:

1—A hydrosoluble polyurethane comprising the following monomers:
a) at least one polyalkylene glycol,
b) at least one polyisocyanate, and
c) at least one monomer of formula (I)

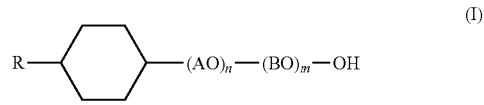

(I)

where:
m and n are integers of less than 150, at least one of which is non-zero,
A and B designate alkyl groups which are different one from another, and having 2 to 4 carbon atoms.
R designates a linear or branched alkyl group containing 8 to 20 carbon atoms.

2—A polyurethane according to Embodiment 1, wherein the AO group designates ethylene oxide, and the BO group designates propylene oxide.

3—A polyurethane according to Embodiment 1, wherein R designates a linear alkyl group having 9 to 12 carbon atoms.

4—A polyurethane according to Embodiment 1, wherein the polyalkylene glycol is polyethylene glycol.

5—A polyurethane according to Embodiment 1, wherein the polyalkylene glycol is a polyethylene glycol of molecular mass by weight of between 2,000 g/mol and 20,000 g/mol.

6—A polyurethane according to Embodiment 1, wherein the polyalkylene glycol is a polyethylene glycol of molecular mass by weight of between 8,000 g/mol and 15,000 g/mol.

7—A polyurethane according to Embodiment 1, wherein the polyisocyanate is selected from the group consisting of toluene diisocyanate and its dimers and trimers, 1,4-butane diisocyanate, 1,6-hexane diisocyanate, isophorone diisocyanate, 1,3- and 1,4-cyclohexane diisocyanate, 4,4' diisocyanatodicyclohexylmethane, 1-methyl-2,4-diisocyanatocyclohexane and its blend with 1-methyl-2,6-diisocyanatocyclohexane, the biuret of hexamethylene diisocyanate and its dimers and trimers, and mixtures thereof.

8—A polyurethane according to Embodiment 1, wherein the hydrosoluble polyurethane does not comprise an alkyl phenol.

9—An aqueous composition comprising water, a hydrosoluble polyurethane according to Embodiment 1, and a surfactant.

10—An aqueous composition according to Embodiment 9, further comprising an additive selected from the group consisting of a biocide, a solvent, an anti-foaming agent, a pH regulator, a coalescence agent, and mixtures thereof.

11—A composition according to Embodiment 9, comprising, expressed as a % by weight of each of its constituents, where the sum of these % s is equal to 100%:
  1) 5% to 45% of said polyurethane,
  2) 5% to 30% of said surfactant,
  3) 25% to 75% of water, and
  4) 0 to 5% of at least one additive selected from the group consisting of a biocide, a solvent, an anti-foaming agent, a pH regulator, a coalescence agent, and mixtures thereof.

12—A method for thickening an aqueous formulation, comprising incorporating the hydrosoluble polyurethane of Embodiment 1 in said aqueous formulation.

13—The method according to Embodiment 12, wherein aqueous formulation is selected from the group consisting of water-based paints, lacquers, varnishes, paper coatings, cosmetic formulations and detergent formulations.

14—An aqueous formulation comprising the hydrosoluble polyurethane of Embodiment 1.

15—A method for preparing a hydrosoluble polyurethane of Embodiment 1, comprising condensing a), b), and c).

As used herein the terms composed of, contains, containing, and terms similar thereto, when referring to the ingredients, parts, reactants, etc., of a composition, component, etc., to method steps, etc., mean, in their broadest sense, "includes at least" (i.e., comprises) but also include within their definition all those gradually restricted meanings until and including the point where only the enumerated materials or steps are included (e.g., consisting essentially of and consisting of).

The above written description of the invention provides a manner and process of making and using it such that any person skilled in this art is enabled to make and use the same, this enablement being provided in particular for the subject matter of the appended claims, which make up a part of the original description. As used herein, the phrases "selected from the group consisting of," "chosen from," and the like include mixtures of the specified materials. The term "mentioned" notes exemplary embodiments, and is not limiting to certain species. As used herein the words "a" and "an" and the like carry the meaning of "one or more."

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A hydrosoluble polyurethane consisting of the following monomers a), b) and c) in % by weight where a), b) and c) add up to 100%:
  a) 75% to 99.5% of at least one polyethylene glycol of molecular mass by weight of between 8,000 g/mol and 15,000 g/mol,
  b) 0.5% to 10% of at least one polyisocyanate, and
  c) 15% to 99.5% of at least one monomer of formula (I)

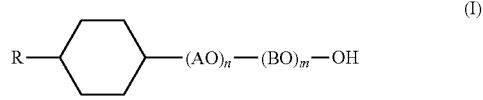

(I)

where:
  m and n are integers of less than 150, at least one of which is non-zero,
  the AO group designates ethylene oxide, and the BO group designates propylene oxide; and
  R designates a linear alkyl group having 9 to 12 carbon atoms.

2. A polyurethane according to claim 1, wherein the polyisocyanate is selected from the group consisting of toluene diisocyanate and its dimers and trimers, 1,4-butane diisocyanate, 1,6-hexane diisocyanate, isophorone diisocyanate, 1,3- and 1,4-cyclohexane diisocyanate, 4,4'diisocyanatodicyclohexylmethane, 1-methyl-2,4-diisocyanatocyclohexane and its blend with 1-methyl-2,6-diisocyanatocyclohexane, the biuret of hexamethylene diisocyanate and its dimers and trimers, and mixtures thereof.

3. An aqueous composition comprising water, a hydrosoluble polyurethane according to claim 1, and a surfactant.

4. An aqueous composition according to claim 3, further comprising an additive selected from the group consisting of a biocide, a solvent, an anti-foaming agent, a pH regulator, a coalescence agent, and mixtures thereof.

5. A composition according to claim 3, comprising, expressed as a % by weight of each of its constituents, where the sum of these % s is equal to 100%:
  1) 5% to 45% of said polyurethane,
  2) 5% to 30% of said surfactant,
  3) 25% to 75% of water, and 4) 0 to 5% of at least one additive selected from the group consisting of a biocide, a solvent, an anti-foaming agent, a pH regulator, a coalescence agent, and mixtures thereof.

6. A method for thickening an aqueous formulation, comprising incorporating the hydrosoluble polyurethane of claim 1 in said aqueous formulation.

7. The method according to claim 6, wherein aqueous formulation is selected from the group consisting of water-based paints, lacquers, varnishes, paper coatings, cosmetic formulations and detergent formulations.

8. An aqueous formulation comprising the hydrosoluble polyurethane of claim 1.

9. A method for preparing a hydrosoluble polyurethane of claim 1, comprising condensing a), b), and c).

* * * * *